US012574651B2

(12) United States Patent
Chen et al.

(10) Patent No.: US 12,574,651 B2
(45) Date of Patent: Mar. 10, 2026

(54) ELECTRONIC DEVICE AND IMAGE PROCESSING METHOD THEREOF

(71) Applicant: ASUSTek COMPUTER INC., Taipei City (TW)

(72) Inventors: Kuan-Yuan Chen, Taipei City (TW); Sheng-Hsiung Chang, Taipei City (TW); Meng-Shan Lin, Taipei City (TW)

(73) Assignee: ASUSTeK COMPUTER INC., Taipei City (TW)

( * ) Notice: Subject to any disclaimer, the term of this patent is extended or adjusted under 35 U.S.C. 154(b) by 86 days.

(21) Appl. No.: 18/755,704

(22) Filed: Jun. 27, 2024

(65) Prior Publication Data

US 2025/0097590 A1 Mar. 20, 2025

(30) Foreign Application Priority Data

Sep. 18, 2023 (TW) ................................ 112135431

(51) Int. Cl.
*H04N 23/80* (2023.01)
*H04N 23/60* (2023.01)

(52) U.S. Cl.
CPC .................................. *H04N 23/80* (2023.01)

(58) Field of Classification Search
CPC ........ H04N 23/80; H04N 23/60; H04N 23/64; H04N 5/2621; H04N 1/00161; H04N 7/01; G09G 5/373; G06T 5/20
See application file for complete search history.

(56) References Cited

U.S. PATENT DOCUMENTS

| | | | | |
|---|---|---|---|---|
| 9,374,097 B2 * | 6/2016 | Taura | H03M 1/56 |
| 9,576,391 B2 * | 2/2017 | Ra | A61B 6/5205 |
| 11,429,926 B2 * | 8/2022 | Bryan | H04N 5/272 |
| 11,570,414 B2 * | 1/2023 | Kuriyama | H04N 5/2621 |
| 2013/0162672 A1 * | 6/2013 | Sen | H04N 1/00161 345/632 |
| 2018/0232312 A1 * | 8/2018 | Kawano | G06F 11/1076 |
| 2021/0049734 A1 * | 2/2021 | Wahrenberg | G06T 5/20 |

FOREIGN PATENT DOCUMENTS

| | | |
|---|---|---|
| CN | 106254775 | 12/2016 |
| CN | 107395960 | 11/2017 |
| CN | 110913138 | 3/2020 |
| CN | 116700654 | 9/2023 |

* cited by examiner

*Primary Examiner* — Hung H Lam
(74) *Attorney, Agent, or Firm* — JCIPRNET

(57) ABSTRACT

An electronic device and an image processing method thereof are provided. The image processing method includes the following steps: detecting whether a buffer has second image data when performing a first compositing operation of first image data; detecting whether an image capturing operation of third image data is performed; judging a first time point for obtaining the third image data; and comparing a second time point for completing the first compositing operation to the first time point and determining whether to perform a second compositing operation of the second image data first or a third compositing operation of the third image data first.

14 Claims, 5 Drawing Sheets

Detecting whether a buffer has second image data when performing a first compositing operation of first image data ——S110

Detecting whether an image capturing operation of third image data is performed ——S120

Judging a first time point for obtaining the third image data ——S130

Comparing a second time point for completing the first compositing operation to the first time point and determining whether to perform a second compositing operation of the second image data first or a third compositing operation of the third image data first ——S140

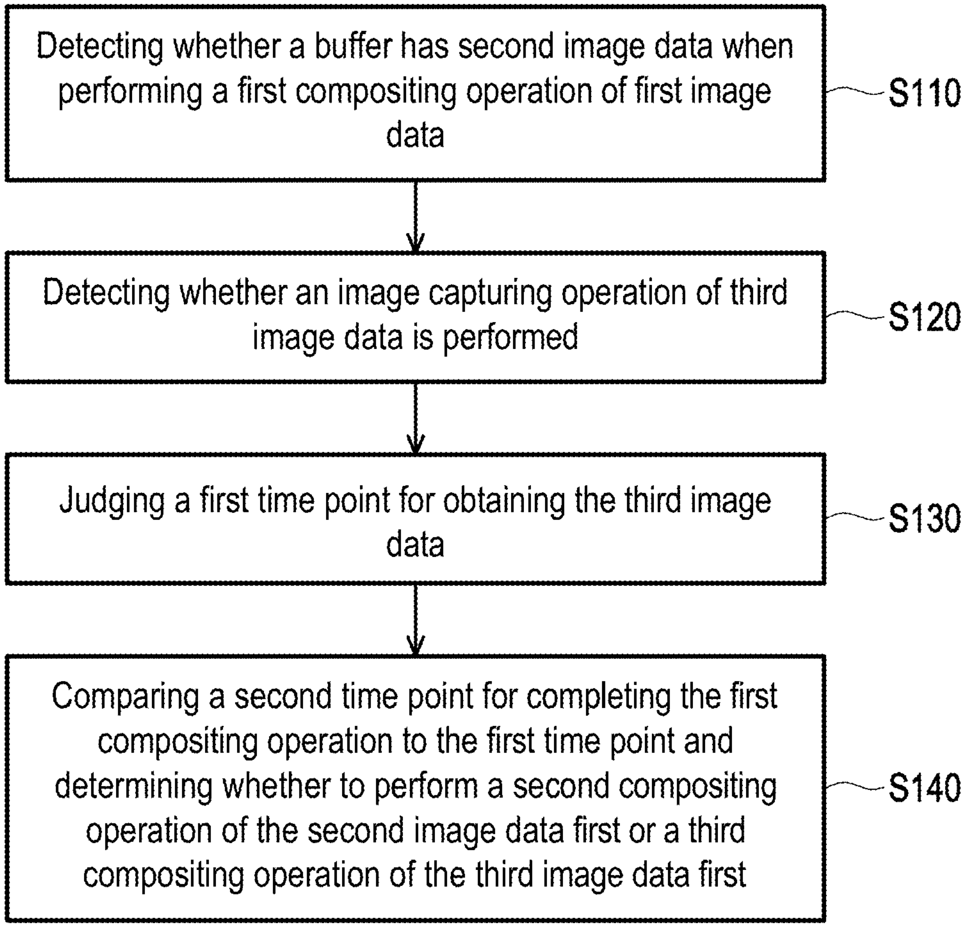

FIG. 1

BUF

BUF

IMG2

BUF

② First compositing operation

④ Waiting for the third image data to be stored

⑦ Second compositing operation

First photo-graphing

310 t2

IMG1

BUF

IMG2

Second photo-graphing

⑥ Third compositing operation

320

IMG2

Third photo-graphing

330

IMG3 t0    t4    t1    t5    Time

BUF

IMG1

IMG3    BUF

IMG2

① Storing first image data

⑤ Storing third image data

IMG2    BUF

③ Storing second image data

ELECTRONIC DEVICE AND IMAGE PROCESSING METHOD THEREOF

CROSS-REFERENCE TO RELATED APPLICATION

This application claims the priority benefit of Taiwan application serial no. 112135431, filed on Sep. 18, 2023. The entirety of the above-mentioned patent application is hereby incorporated by reference herein and made a part of this specification.

BACKGROUND

Technical Field

The disclosure relates to an electronic device and an image processing method thereof, and in particular, relates to an image processing method capable of adjusting the sequence of image data processing.

Description of Related Art

Generally, when an image-capturing application of an electronic device is used to capture an image, the time it takes from when the shutter button is pressed until the photo is archived generally includes the time it takes to capture the photo (for example, to capture footage) and the time it takes to composite the photo. If the shutter button is continuously pressed for several times to take several photos (from when the shutter being pressed until the photo being archived is one-time photographing), footage capturing and photo compositing of different times of photographing cannot be performed at the same time. However, while the previous photo is being composited, the next photo capturing may be performed at the same time.

When a user is performing an image capturing operation of taking several photos continuously, the user generally wants to see the compositing result of the last photo being taken as soon as possible. However, the steps of compositing a photo of a single time of photographing are time-consuming. The photo which is taken by pressing the shutter button later will have to wait to be composited until all the photos that are taken earlier are composited, and the compositing operation of this photo may then be performed. As a result, for the last photo taken by the user, the user has to wait a long time to see the finished photo that has been composited and archived.

SUMMARY

The disclosure provides an electronic device and an image processing method thereof capable of quickly completing a photo taken by a user at a later time.

The disclosure provides an image processing method, and the method include the following steps. When a first compositing operation of first image data is performed, it is detected whether a buffer has second image data. It is detected whether an image capturing operation of third image data is performed. A first time point for obtaining the third image data is judged. A second time point for completing the first compositing operation is compared to the first time point, and it is determined whether to perform a second compositing operation of the second image data first or a third compositing operation of the third image data first.

The disclosure further provides an electronic device including an image camera, a buffer, and a controller. The controller is coupled to the image camera and the buffer. The controller is configured to perform the abovementioned image processing method.

To sum up, in the disclosure, by judging the time point for completing the current image capturing operation and the time point for completing the compositing operation corresponding to the image data that is obtained relatively early, it is determined whether to perform the compositing operation of the image data that is obtained relatively late first. In this way, in the image processing method provided by the disclosure, the compositing result of the image data that is obtained relatively late can be provided to the user in real time, and the user's needs are therefore satisfied.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 1 is a flow chart illustrating an image processing method according to an embodiment of the disclosure.

DESCRIPTION OF THE EMBODIMENTS

Figure 2:
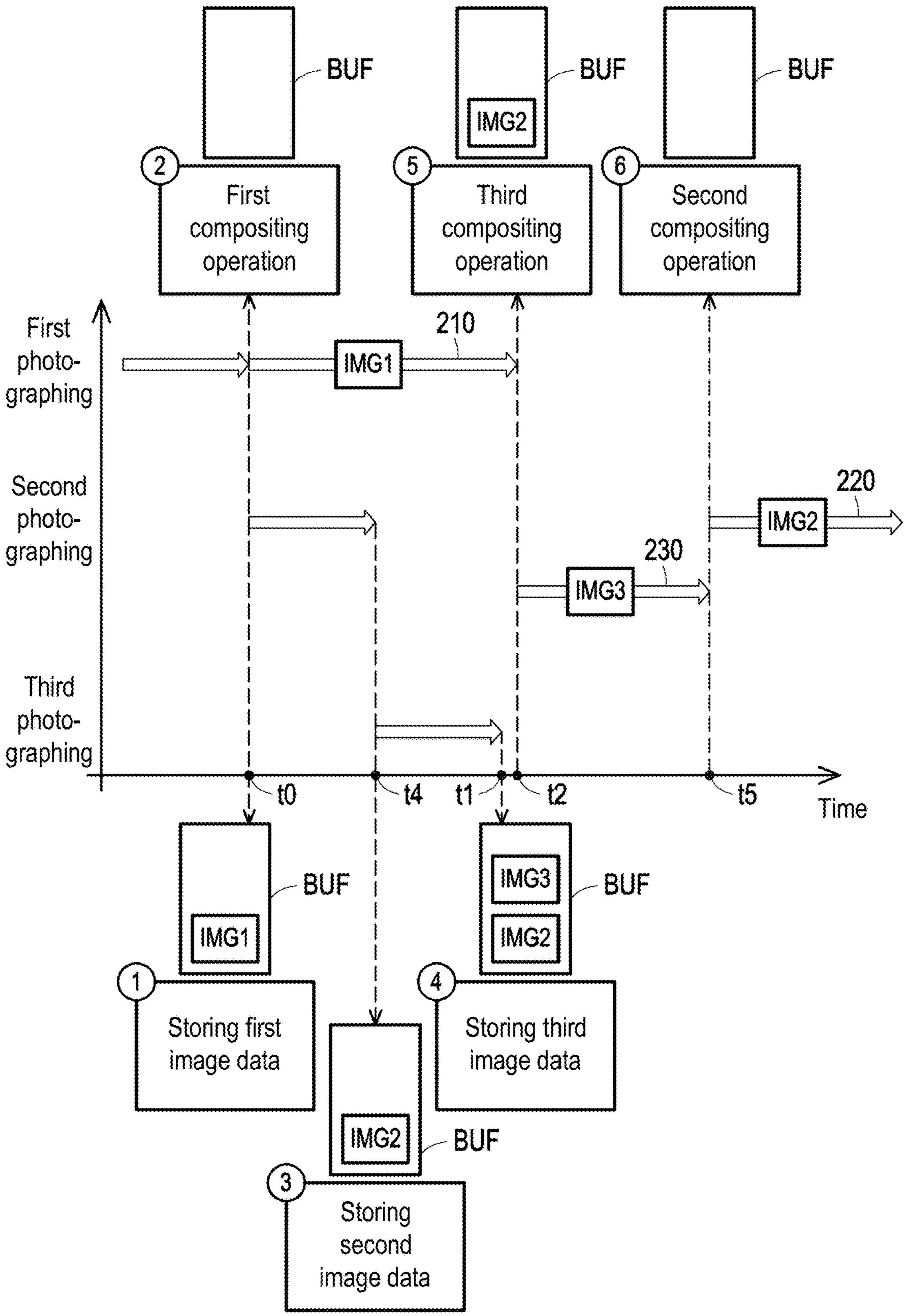
FIG. 2 to FIG. 4 are schematic flow charts illustrating multiple implementations of the image processing method according to an embodiment of the disclosure.

With reference to FIG. 1, in the embodiments of the disclosure, a plurality of continuous image capturing operations are performed. During the process of each of the image capturing operations, the obtained image data may be stored in a buffer. In this embodiment, the buffer may have a stacked data structure and exhibit first-in last-out characteristics. The steps of the disclosure may be performed by a controller in an electronic device, and the electronic device an electronic device of any form with an image capturing function, without specific limitations.

First, in step S110, when performing a first compositing operation of first image data, the controller may detect whether the buffer has another second image data. Further, in step S120, the controller may detect whether an image camera of the electronic device is performing an image capturing operation of third image data. During the process of the first compositing operation of the first image data, if the controller detects that the image camera of the electronic device is performing the image capturing operation of the third image data, the controller may judge a time point (first time point) for completing the image capturing operation of the third image data, that is, the time point for obtaining the third image data. Further, the controller may calculate a time point (second time point) for completing the first compositing operation of the first image data being performed.

It is worth mentioning that the time points for completing the image capturing operations of the image data mentioned in this embodiment refer to the time when the capturing of the image data is completed and the image data is stored into the buffer. That is, after the time points for completing the image capturing operations of the image data, the corresponding image data is stored into the buffer and is in an available state.

Further, in step S140, the controller may compare the second time point for completing the first compositing operation to the first time point for completing the third image data and then determine whether to perform a second compositing operation of the second image data first or a third compositing operation of the third image data first according to a comparison result.

To explain in detail, in step S140, when the controller learns through comparison that the first time point for obtaining the third image data is earlier than the second time point for completing the first compositing operation, it means that the third image data is in the available state when the first compositing operation is completed. Therefore, after the first compositing operation is completed, the controller may extract the third image data from the buffer and perform the third compositing operation performed on the third image data. Not until the abovementioned third compositing operation is completed will the second compositing operation performed on the second image data be performed.

In such a state, the third compositing operation of the third image data obtained relatively late may be performed relatively early, and the second compositing operation of the second image data obtained relatively early may be performed relatively late. Therefore, a user may obtain a compositing result of the last captured third image data earlier.

On the other hand, in step S140, when the controller learns through comparison that the first time point for obtaining the third image data is not earlier than the second time point for completing the first compositing operation, the controller further predicts a third time point for completing the second compositing operation of the second image data based on the second time point for completing the first compositing operation. Further, the controller may compare the first time point to the third time point, and when the first time point is not later than the third time point, the controller first performs the third compositing operation performed on the third image data. Not until the third compositing operation is completed will the second compositing operation of the second image data is performed.

In contrast, when the first time point is later than the third time point, the controller may choose to perform the second compositing operation of the second image data first and only perform the third compositing operation of the third image data after the second compositing operation is completed.

It is worth mentioning that in this embodiment, in the abovementioned compositing operations, a main post-processing operation and other post-processing operations may be performed on the corresponding image data. The main post-processing operation includes the compositing operation of multiple photos and corresponding image data. The purpose is to reduce noise, adjust brightness, improve image quality, etc. In the main post-processing operation, which algorithm to use for processing may be determined based on the image capturing method (e.g., high dynamic range (HDR), portrait mode, small flower mode, etc.). The algorithms corresponding to the relevant image capturing methods are well known to a person having ordinary skill in the art, so description thereof is not provided in detail herein. Other post-processing operations include mirroring, rotation, watermarking, etc., are configured to make final adjustments to the composite image according to the user's needs. In this embodiment, the time required for the main post-processing operation is longer than the time required for other post-processing operations.

In addition, in the embodiments of the disclosure, regarding the implementation of prediction of the time points for completing the compositing operations and the prediction of the time points for completing the image capturing operations, the controller may establish a machine learning model in advance. Further, the controller may record the parameters of each image capturing operation of the image data, such as the image capturing mode, brightness, shutter, aperture, and other parameters that may affect the image capturing operation and the duration of the compositing operation. The controller then records the actual time of obtaining the image data corresponding to each image capturing operation of the image data and the time required for the compositing operation. The controller may further use the above recorded information to train the machine learning model. After training with a specific amount of information is completed, the controller predicts the time of obtaining the image data corresponding to the image capturing operation and the time required for the compositing operation based on the parameters of each image capturing operation of the image data through the trained machine learning model and calculates the abovementioned first time point and third time point.

Figure 3:
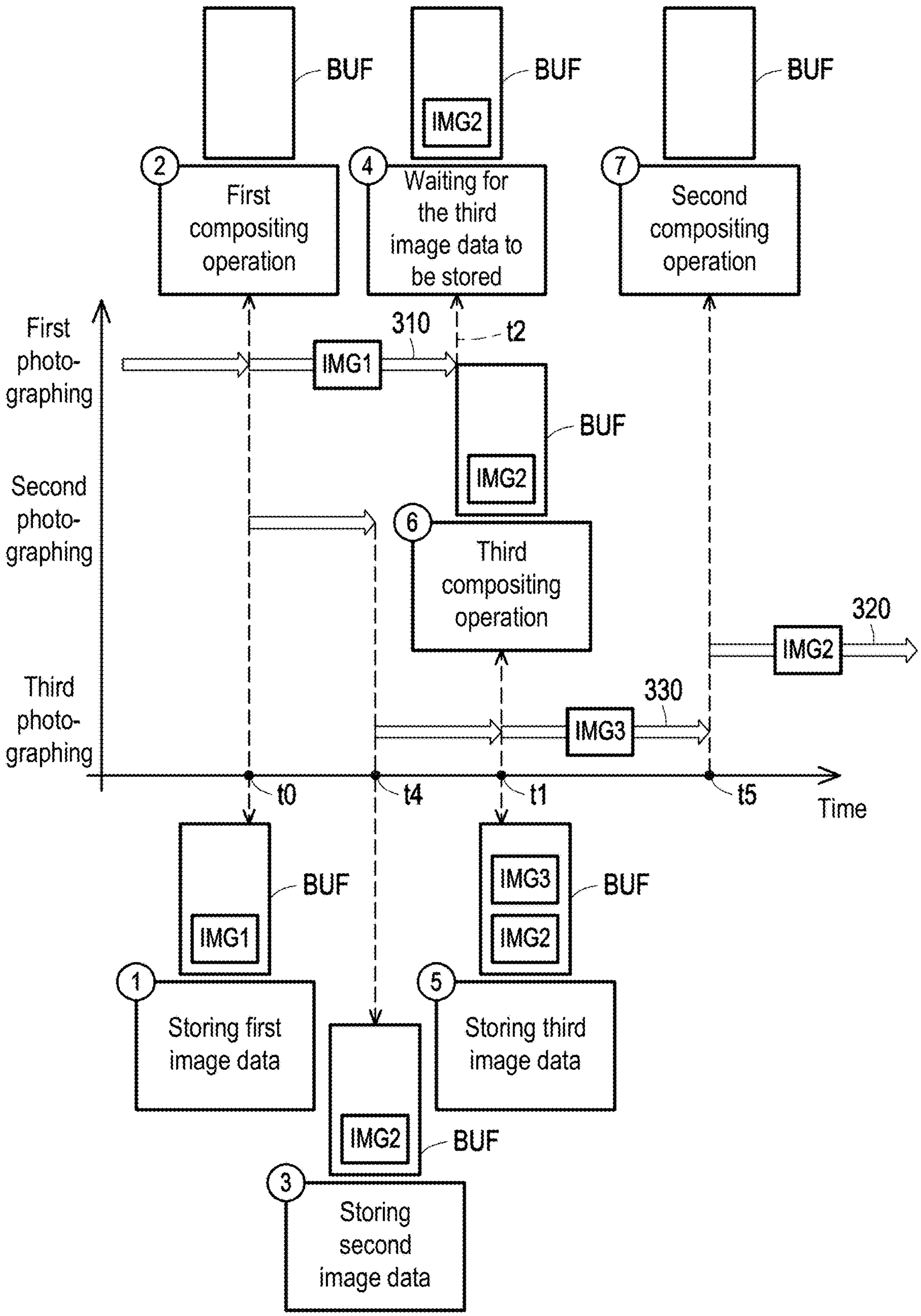
Figure 4:
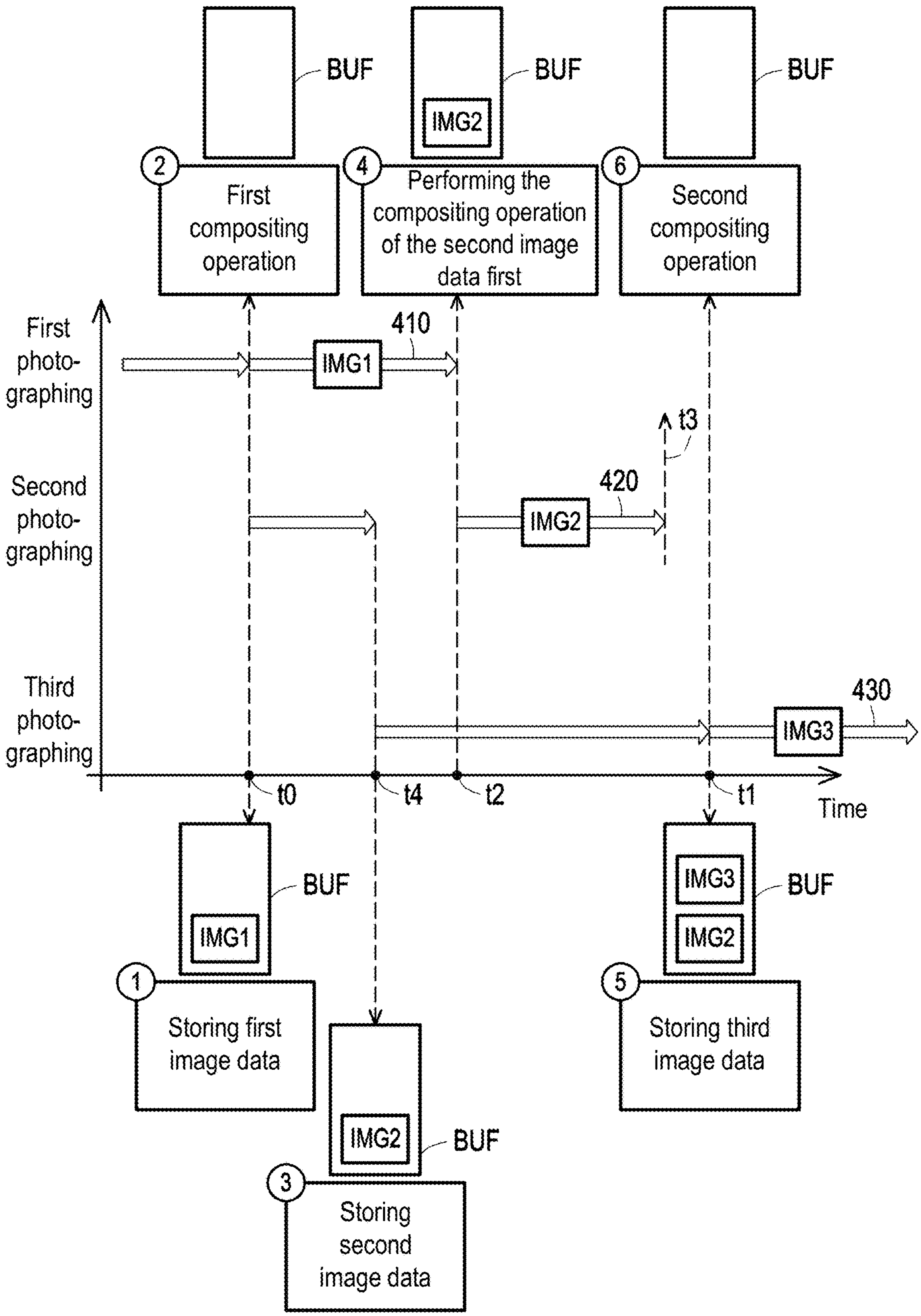

With reference to FIG. 2 to FIG. 4, in FIG. 2, first photographing is performed first, and first image data IMG1 is obtained at a time point t0. Herein, the first image data IMG1 is stored into a buffer BUF at the time point t0 (step 1). The buffer BUF is a stacked buffer and exhibits input and output characteristics of first-in last-out. Next, the controller may read the first image data IMG1 in the buffer BUF after the time point to and performs a first compositing operation 210 of the first image data IMG1 in step 2. Further, the controller may predict a time point t2 for completing the first compositing operation 210.

Besides, when the first compositing operation 210 of the first image data IMG1 is performed, second photographing is performed. Second image data IMG2 obtained during the second photographing is stored into the buffer BUF at a time point t4 (step 3). The time point t4 is earlier than the time point t2. After the time point t4, third photographing is performed, and at this time, the controller may determine a time point t1 for obtaining third image data IMG3 corresponding to the third photographing. In this embodiment, the time point t1 is earlier than the time point t2. Further, in step 4, at the time point t1, the third image data IMG3 is stored into the buffer BUF and stacked on the second image data IMG2.

After the first compositing operation 210 is completed, based on the fact that the third image data IMG3 is in the available state at the time point t2, the controller may, in step 5, read the third image data IMG3 from the buffer BUF and perform a third compositing operation 230 on the third image data IMG3. Next, at a time point t5 for completing the third compositing operation 230, the controller may, in step 6, read the second image data IMG2 from the buffer BUF and perform a second compositing operation 220 on the second image data IMG2.

In FIG. 3, the first photographing is performed first, and the first image data IMG1 is obtained at the time point to. Herein, the first image data IMG1 is stored into the buffer BUF at the time point t0 (step 1). Next, the controller may read the first image data IMG1 in the buffer BUF after the time point t0 and performs a first compositing operation 310 of the first image data IMG1 in step 2.

When the first compositing operation 310 is performed, the second photographing and the third photographing are sequentially performed, and the second image data IMG2 obtained during the second photographing is stored into the buffer BUF at the time point t4 (step 3).

At the time point t2, the first compositing operation 310 is completed, but the third image data IMG3 to be obtained during the third photographing is not yet available. At this time, the controller may predict, based on the time point t2, the time point for completing the second compositing operation of the second image data IMG2 and the time point t1 at which the third image data IMG3 is in the available state. Further, the controller compares the time point for completing the second compositing operation of the second image data IMG2 to the time point t1. In this embodiment, the time point t1 at which the third image data IMG3 is in the available state is earlier than the time point for completing the second compositing operation of the second image data IMG2. Therefore, the controller may decide to wait at the time point t2 to wait for the third image data IMG3 to be stored into the buffer BUF.

At the time point t1, the third image data IMG3 is stored into the buffer BUF and stacked on the second image data IMG2 (step 5). Next, in step 6, the controller may read the third image data IMG3 from the buffer BUF and perform a third compositing operation 330 of the third image data IMG3.

The third compositing operation 330 of the third image data IMG3 is completed at the time point t5, and therefore, at the time point t5, the controller may, in step 7, read the second image data IMG2 from the buffer BUF and perform a second compositing operation 320 of the second image data IMG2.

In FIG. 4, the first photographing is performed first, and the first image data IMG1 is obtained at the time point to. Herein, the first image data IMG1 is stored into the buffer BUF at the time point t0 (step 1). Next, the controller may read the first image data IMG1 in the buffer BUF after the time point t0 and performs a first compositing operation 410 of the first image data IMG1 in step 2. When the first compositing operation 410 is performed, the second photographing is performed, an operation of obtaining the second image data IMG2 is completed at the time point t4, and the second image data IMG2 is stored into the buffer BUF (step 3). Herein, at the time point t4, the first compositing operation 410 has not yet been completed.

Next in step 3, before the first compositing operation 410 is completed, the third photographing is performed.

At the time point t2, the first compositing operation 410 is completed. In step 4, the controller may calculate the time point t3 for completing a second compositing operation 520 of the second image data IMG2 by predicting the duration required for the second compositing operation 520 of the second image data IMG2 based on the time point t2. Further, the controller also predicts the time point t1 for obtaining the third image data IMG3 corresponding to the third photographing. The controller compares the time point t2 to the time point t1. In this embodiment, since the time point t2 is earlier than the time point t1, the controller determines to perform the second compositing operation 520 of the second image data IMG2 first in step 4. Next, in step 5, at the time point t1, the third image data IMG3 corresponding to the third photographing is stored into the buffer BUF. In step 6 (at the time point t1 or after the time point t1), the controller may read the third image data IMG3 from the buffer BUF and perform a third compositing operation 430.

Figure 5:
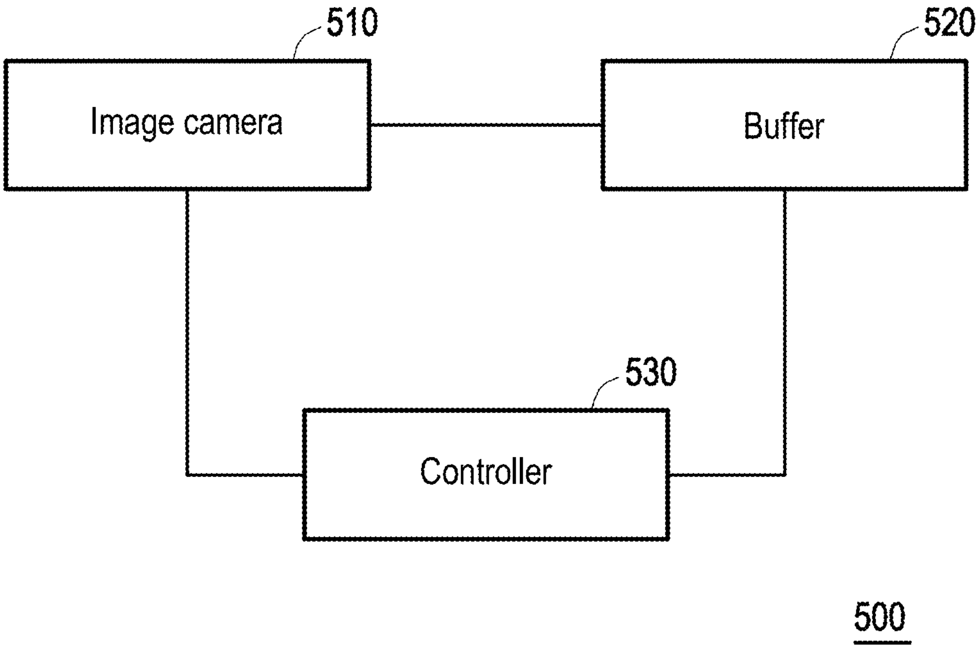
FIG. 5 is a schematic view illustrating an electronic device according to an embodiment of the disclosure.

With reference to FIG. 5 below, FIG. 5 is a schematic view illustrating an electronic device according to an embodiment of the disclosure. An electronic device 500 includes an image camera 510, a buffer 520, and a controller 530. The controller 530 is coupled to the image camera 510 and the buffer 520. The image camera 510 may be used to capture a still image or a dynamic image. The buffer 520 is a stacked buffer and exhibits input and output characteristics of first-in last-out.

In an embodiment, the controller 530 is configured to perform the foregoing embodiments and the steps in the implementations. The relevant details have been described in detail in the foregoing embodiments and implementations, so description thereof is not repeated herein.

Regarding the hardware architecture, the image camera 510 may be a camera of any form, and the buffer 520 may apply any first-in-last-out buffer circuit that is well known to a person having ordinary skill in the art. The controller 530 may be designed through hardware description language (HDL) or any other digital circuit design well known to a person of ordinary skill in the art and may be a hardware circuit implemented through a field programmable gate array (FPGA), a complex programmable logic device (CPLD), or an application-specific integrated circuit (ASIC).

In view of the foregoing, in the embodiments of the disclosure, the electronic device obtains the first time point for obtaining the third image and the second time point for completing the compositing operation of the first image through prediction. Further, by comparing the first time point to the second time point, the electronic device determines whether to perform the second compositing operation of the second image data first or the third compositing operation of the third image data first. In this way, the electronic device may first provide the user with the compositing result of the third image data which is captured relatively late, and the user's needs are therefore satisfied.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image processing method, comprising:

detecting whether a buffer has second image data when performing a first compositing operation of first image data;

detecting whether an image capturing operation of third image data is in progress;

judging a first time point for obtaining the third image data; and comparing a second time point for completing the first compositing operation to the first time point and determining whether to perform a second compositing operation of the second image data first or a third compositing operation of the third image data first.

2. The image processing method according to claim 1, wherein when the first time point is earlier than the second time point, the third compositing operation is performed first, and then the second compositing operation is performed.

3. The image processing method according to claim 2, wherein when the first time point is not earlier than the second time point, the image processing method further comprises:

predicting a third time point for completing the second compositing operation of the second image data at the second time point for completing the first compositing operation; and comparing the first time point to the third time point and determining whether to perform the second compositing operation first or the third compositing operation first.

4. The image processing method according to claim 3, wherein when the first time point is not later than the third time point, the third compositing operation is performed first, and then the second compositing operation is performed.

5. The image processing method according to claim 3, wherein when the first time point is later than the third time point, the second compositing operation is performed first, and then the third compositing operation is performed.

6. The image processing method according to claim 3, further comprising:

recording a plurality of image capturing parameters corresponding to a plurality of image capturing operations and a plurality of image capturing times and a plurality of image compositing times corresponding to the image capturing parameters;

performing a training operation of a mechanical model based on the image capturing times and the image compositing times corresponding to the image capturing parameters; and obtaining the first time point and the third time point according to the mechanical model.

7. The image processing method according to claim 1, further comprising:

storing, by the buffer, the first image data, the second image data, and the third image data according to a stacked data structure.

8. An electronic device, comprising:

an image camera;

a buffer coupled to the image camera; and a controller coupled to the image camera and the buffer and configured to:

detect whether a buffer has second image data when performing a first compositing operation of first image data, detect whether an image capturing operation of third image data is performed, judge a first time point for obtaining the third image data, and compare a second time point for completing the first compositing operation to the first time point and determine whether to perform a second compositing operation of the second image data first or a third compositing operation of the third image data first.

9. The electronic device according to claim 8, wherein the controller is further configured to:

perform the third compositing operation first and then perform the second compositing operation when the first time point is earlier than the second time point.

10. The electronic device according to claim 9, wherein the controller is further configured to:

predict a third time point for completing the second compositing operation of the second image data at the second time point for completing the first compositing operation, and compare the first time point to the third time point and determine whether to perform the second compositing operation first or the third compositing operation first.

11. The electronic device according to claim 10, wherein the controller is further configured to:

perform the third compositing operation first and then perform the second compositing operation when the first time point is not later than the third time point.

12. The electronic device according to claim 10, wherein the controller is further configured to:

perform the second compositing operation first and then perform the third compositing operation when the first time point is later than the third time point.

13. The electronic device according to claim 10, wherein the controller is further configured to:

record a plurality of image capturing parameters corresponding to a plurality of image capturing operations and a plurality of image capturing times and a plurality of image compositing times corresponding to the image capturing parameters, perform a training operation of a mechanical model based on the image capturing times and the image compositing times corresponding to the image capturing parameters, and obtain the first time point and the third time point according to the mechanical model.

14. The electronic device according to claim 8, wherein the buffer stores the first image data, the second image data, and the third image data according to a stacked data structure.

* * * * *